United States Patent [19]

Kaplan

[11] Patent Number: 5,280,275

[45] Date of Patent: Jan. 18, 1994

[54] GRAPHICAL INTERFACE CONTROL BUTTONS WITH SCALAR VALUES

[75] Inventor: Craig A. Kaplan, Santa Cruz, Calif.

[73] Assignee: International Business Machines Corporation, Armonk, N.Y.

[21] Appl. No.: 828,535

[22] Filed: Jan. 24, 1992

[51] Int. Cl.⁵ .............................................. G09G 3/02
[52] U.S. Cl. ................... 345/157; 364/419.01; 345/163
[58] Field of Search ............... 340/709, 706, 721, 710, 340/712, 723; 364/419

[56] References Cited

U.S. PATENT DOCUMENTS

| | | | |
|---|---|---|---|
| 4,698,624 | 10/1987 | Barker et al. | 340/709 |
| 4,745,402 | 5/1988 | Auerbach | 340/709 |
| 4,896,291 | 1/1990 | Gest et al. | 340/709 |
| 5,060,135 | 10/1991 | Levine et al. | 364/200 |

*Primary Examiner*—Alvin E. Oberley
*Assistant Examiner*—Regina Liang
*Attorney, Agent, or Firm*—G. Marlin Knight

[57] ABSTRACT

A method and apparatus for allowing users of computers having a graphical user interface to efficiently convey scalar control information (such as Likert scale data) are described. A graphical control button is displayed on the screen combined with a graphical scale (which may be implicit) to enable users to convey the command to execute the function associated with the control button while conveying additional scalar information by controlling the particular region of the control button on which the cursor is positioned. The cursor position is preferably controlled by a pointing device such as a mouse. The scale of values assigned to the control button may be displayed continuously on the button or the scale may be displayed only after the cursor has been placed on the button and the mouse key depressed, but not released. A scale pointer showing the precise scale position corresponding to the cursor position may be displayed in addition to or in place of the cursor. One use of the invention is to have a user browsing tutorial text indicate the degree of usefulness of sections of the text by using control buttons of the invention for the page forward and backward functions. The system could then dynamically adjust the tutorial based on user ratings.

14 Claims, 5 Drawing Sheets

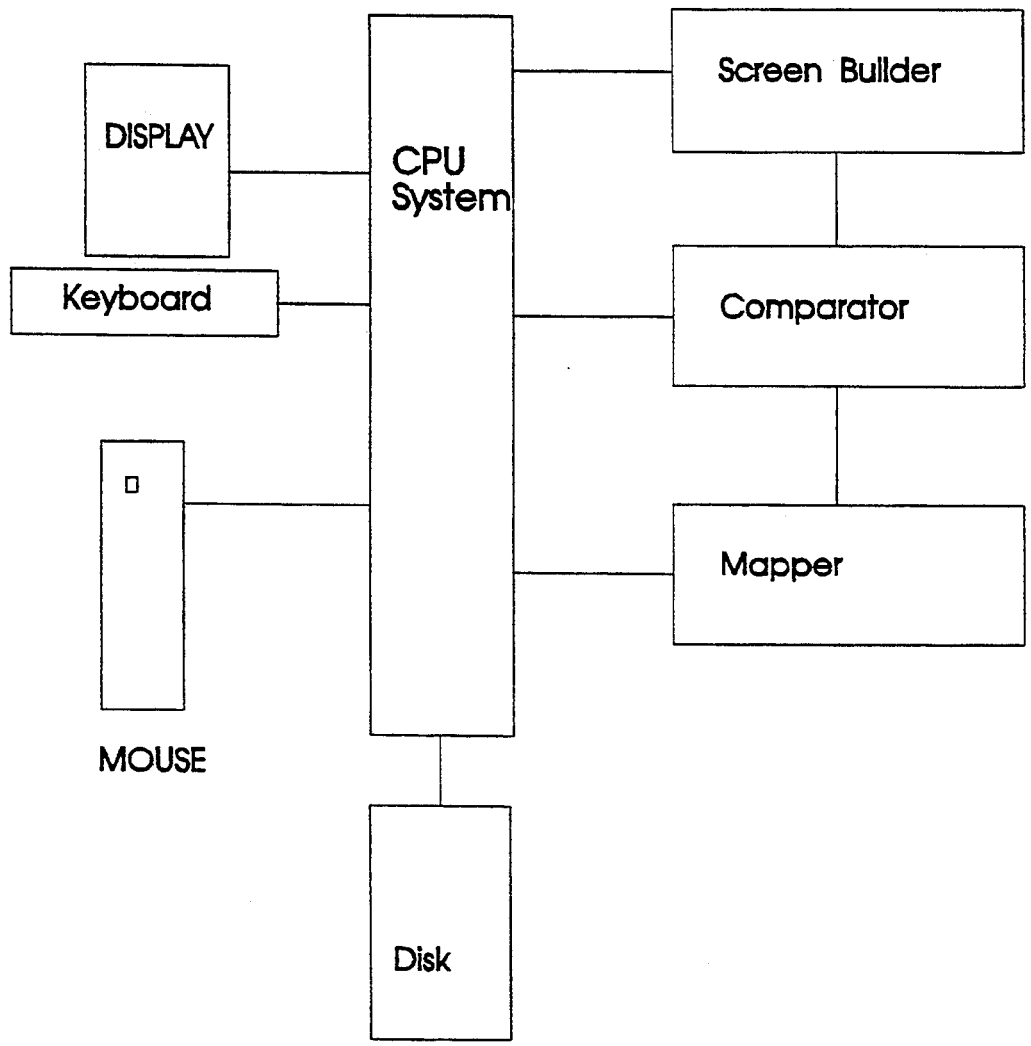
Figure 1
(Amended)

GRAPHICAL INTERFACE CONTROL BUTTONS WITH SCALAR VALUES

TECHNICAL FIELD

The present invention relates to methods and systems in the field of user interfaces for computer systems and more particularly to techniques for users to convey quantitative and/or qualitative information to the system using a graphical interface.

BACKGROUND OF THE INVENTION

Many computer programs require interaction with a user to function effectively and/or to be useful. Simple tasks such as displaying text on a display screen require that a user communicate information to the computer about the data to be displayed, when to page forward or backward, etc. Quantitative information can be entered by pressing the numerical keys on the computer keyboard. The more efficiently information can be conveyed to the computer, the more usable and effective the system becomes.

Commercially available graphical user interfaces usually combine a high resolution screen with a pointing device such as a mouse, track ball, or digitizer tablet in addition to the more traditional keyboard. A graphical cursor may be moved around the screen using the pointing device. A typical program will display data along with icons or control buttons on the screen and allow the user to enter information through the keyboard or by positioning a cursor on an icon or control button and then pressing a mouse button or other key to indicate that the system should read the cursor position and execute a function assigned to the icon or control button. A control button might be assigned the page forward function, for example. Icons and control buttons are functionally interchangeable. The term icon normally refers to some type of representational image. An image of a trash can might be used for an icon associated with a discard function. A control button on the screen is normally a representation of a key and would typically be rectangular, elliptical or circular and would be labelled as would keys on a keyboard. Thus, a page down control button might be labelled with the words "page down" or a downward pointing arrow.

The Operating System/2 (OS/2) Presentation Manager, which is a computer program commercially available from the International Business Machines Corporation (IBM) uses a graphical interface which allows the user to page forward and backward in a document by positioning the cursor on a vertical control bar at the edge of the screen. The relative position of the page currently being displayed in the document is indicated on the control bar by a small rectangle. Pressing the mouse button (clicking) when the cursor is above the rectangle causes the system to page backwards and clicking on the space below the rectangle causes a page forward function. The user can cause multiple pages to be skipped forward or backward by dragging the rectangle up or down using the mouse.

It is sometimes desirable to know whether a user "likes" or "finds useful" data that is being displayed on a screen. Methods for quantifying such subjective feelings date back at least to the 1930's. One method is to use a Likert scale. The Likert scale was developed in 1932 by psychologist R. Likert to measure people's attitudes about various things. Instead of presenting a dichotomous Yes/No question, the Likert scale allows people to rate their agreement with a question or proposition on a variable scale, typically ranging from 1 to 5, with 1 meaning disagreement, for example. The Likert scale is still widely used in psychological research and testing.

There is a need for efficient methods of allowing computer users to indicate Likert scale and other scalar information to a computer program.

SUMMARY OF THE INVENTION

The present invention combines Likert scales and control buttons to allow users to efficiently convey scalar control information (such as Likert information) while simultaneously conveying additional information to the computer system. Using the invention's graphical interface control buttons with scalar values (Smart Buttons) users can indicate a preference on a scale dimension while simultaneously asking the computer to execute some action. The computer system displays a control button which will typically be labelled to indicate the associated function such as page forward or backward. A graphical scale may also be displayed on or near the button indicating the regions (positions) on the button associated with the range of control values. The scale may be displayed either continuously or only upon demand, as when a user presses a certain key after positioning the cursor or the control button. The user positions the cursor on the region of the control button associated with the desired control value then presses (or releases) a key to cause the system to execute the function associated with the control button and also to store the control value for subsequent use. The control value may be used by the function associated with the control button or by a relatively unrelated function. One use of the invention is to have a user browsing tutorial text indicate the degree of usefulness of sections of the text by using smart buttons for the page forward and backward functions. The system could then dynamically adjust the tutorial based on user ratings.

The position of the cursor on the button may be converted into the control value by assigning a first region of the button, e.g., the leftmost region, the lowest control value and the last region, e.g., the rightmost region, the highest control value. The values associated with the intervening regions will typically vary uniformly from the lowest to the highest value based on the region's proximity to the first or last region.

BRIEF DESCRIPTION OF THE DRAWINGS

FIG. 1 is a block diagram of a computer system which implements Smart Buttons.

DETAILED DESCRIPTION OF THE INVENTION

FIG. 1 is a block diagram of a computer system according to the invention. The Display, Keyboard, Mouse and CPU System are of conventional type. As used herein, the CPU System contains both ROM and RAM accessible to the software and other hardware in the system. The Screen Builder causes the data and the control buttons to be displayed and communicates the position and shape of the buttons to the Comparator. The Comparator also uses cursor position information obtained from the CPU System. The Comparator determines whether the user has pressed the execute key(s), e.g., mouse button, and whether the cursor is located on a control button. The Mapper generates the control value based on knowledge of the control button boundaries and the maximum and minimum values allowable for the control value. In the preferred embodiment the Screen Builder, Comparator and Mapper are implemented in software which is stored on the Disk and is loaded into RAM for execution.

Figure 5:
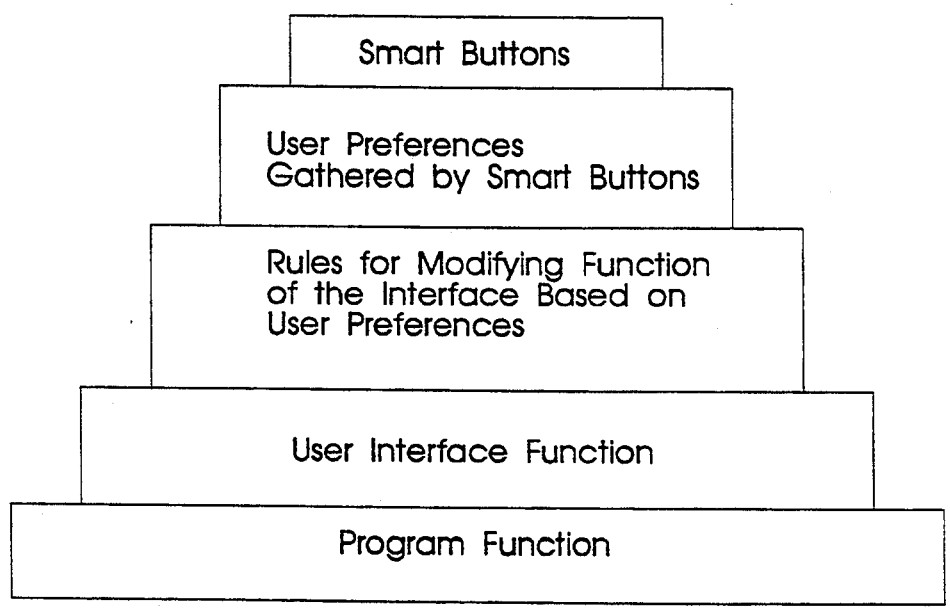
FIG. 5 shows architectural layers in a system implementing Smart Buttons.

FIG. 5 illustrates a layered architecture which could be used to implement Smart Buttons. The base layer consists of the function of the program itself. On top of this layer, is the code that accomplishes standard user interface functions. Most current programs can be viewed as comprising these two layers.

Smart Buttons imply that the programs have some sort of knowledge (e.g., rule based expertise) that allows the function of the interface or program to be modified in an intelligent way. For example, knowledge about when to terminate a database search might be encoded as a rule: If the user prefers a quick search, terminate the search after 5 seconds has elapsed. This rule references user preference data that can be viewed as residing in an additional layer in the architecture.

Since Smart Buttons provide a way of gathering user preferences, they would reside in the top architectural layer and would modify the user preference layer just beneath. The user preference layer in turn determines which rules in the knowledge layer come into play. These rules, in turn, affect the function of the user interface and/or the program.

Figure 2:
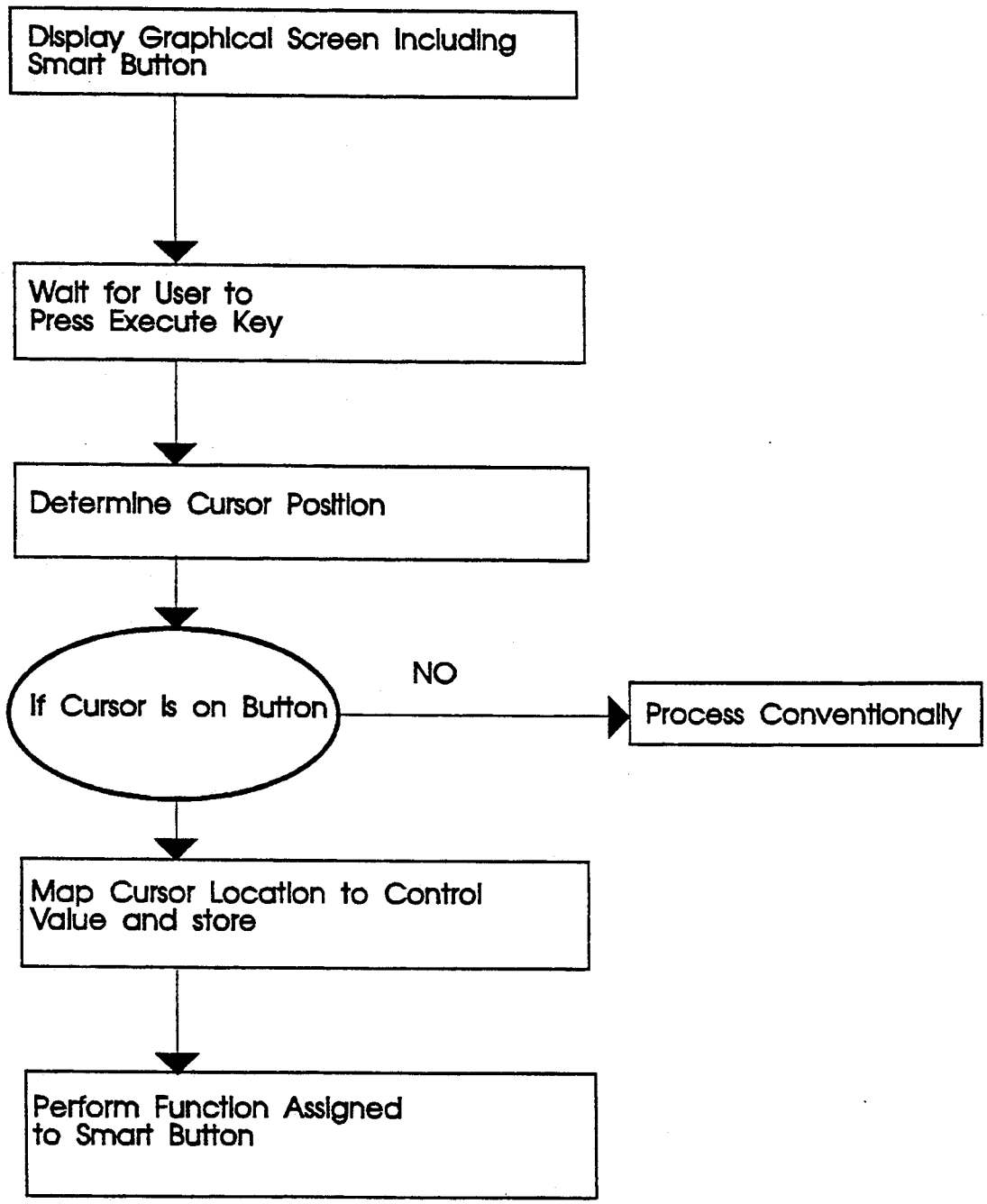
FIG. 2 is a overview of the steps of using Smart Buttons.

FIG. 2 is an overview diagram of the steps of the method of the invention. The screen containing the control button (Smart Button) and any additional data, such as tutorial text, is displayed. Optionally the Smart Button may have a scale displayed on or near it to give the user an indication of the control value assigned to different regions of the button. The system then waits until the user presses an appropriate key at which time the current position of the cursor is found through conventional means. The cursor position is compared to the position of the Smart Button. If the cursor is not located inside of (on) the button, then conventional processing is performed. When the cursor is on the button, then the cursor location must be mapped to a control value which is stored in RAM or on disk for subsequent use. The function associated with the button, such as PAGE FORWARD, is then executed.

Figure 3:
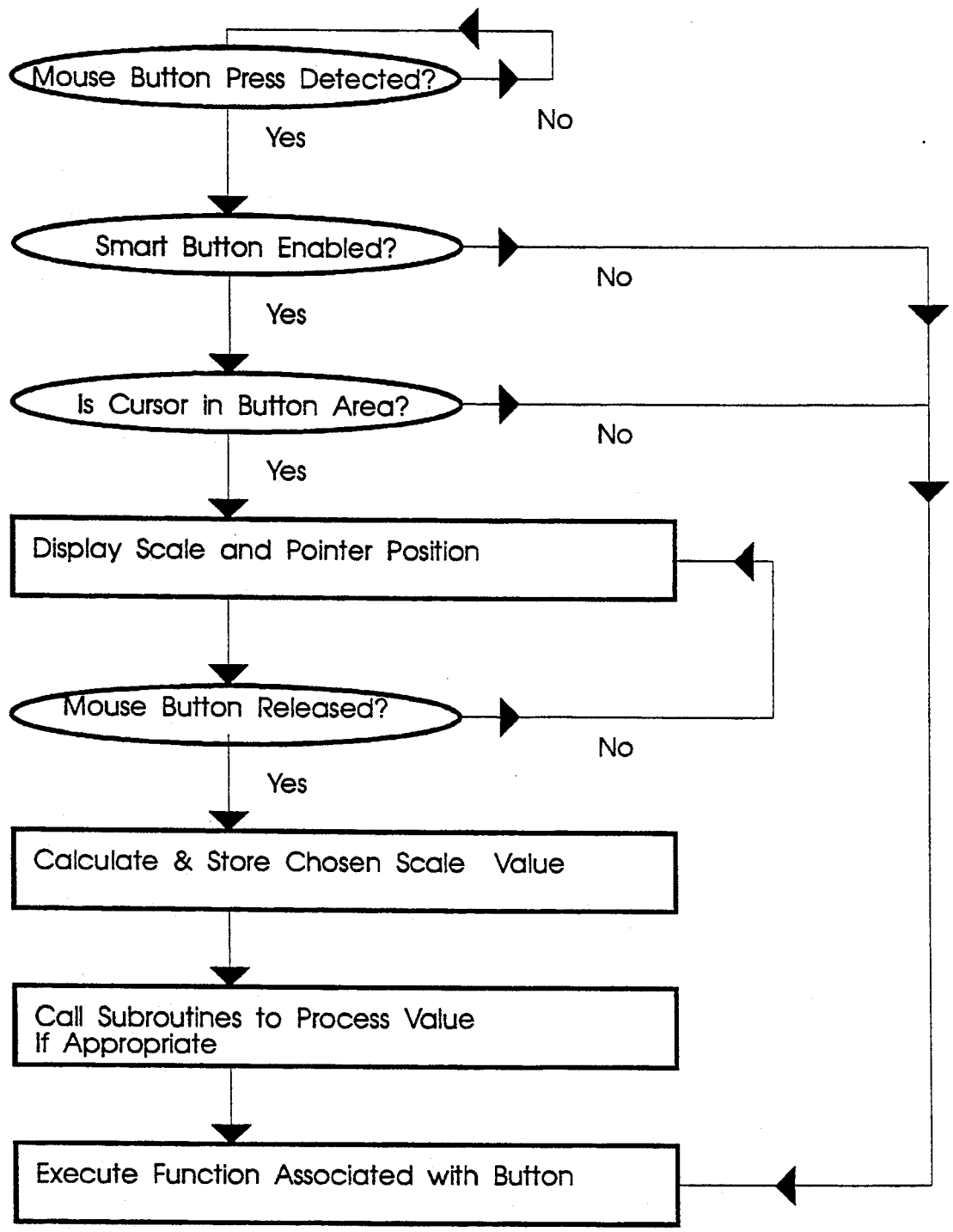
FIG. 3 is a overview of an enhanced method of using Smart Buttons.

FIG. 3 is an overview diagram of the steps of a modified method of practicing the invention. The screen containing the control button (Smart Button) is assumed to already be displayed. The system then waits until the user presses an appropriate key as before, but in this case the user will press, but not release the key, i.e., hold the key down. When the term mouse button or mouse key is used it is intended to mean any key associated with a cursor pointing device. The next step is to test whether the Smart Button is enabled. This allows the Smart Button processing to be turned off by user or system action. If Smart Button processing is enabled then the current position of the cursor is found through conventional means. The cursor position is compared to the position of the Smart Button. If the cursor is not located inside of or on the button, then conventional processing is performed. When the cursor is determined to be on the button, then a control value scale and pointer is displayed on or near the Smart Button. Displaying the scale only upon demand cuts down the clutter on the screen. The pointer is a visual indicator of the scale value which corresponds to the current cursor position. The use of a pointer provides a more precise visual indication of the scale value which will be recorded. The pointer may be displayed in place of or in addition to the normal cursor graphic. The user positions the pointer at the desired point on the scale by moving the mouse while continuing to hold down the mouse button. When the user releases the button, the computer system uses this as the execute signal. The cursor location must then be mapped to a control value which is stored in RAM or on disk for subsequent use.

Figure 4:
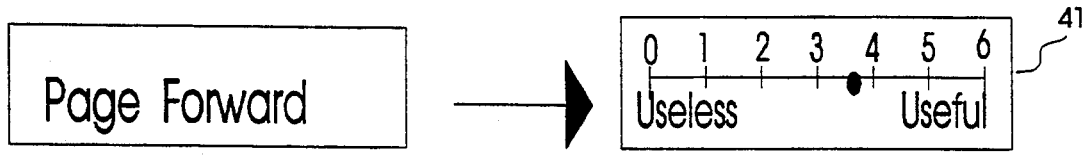
FIG. 4 shows sample Smart Buttons and associated scales.
Figure 4:
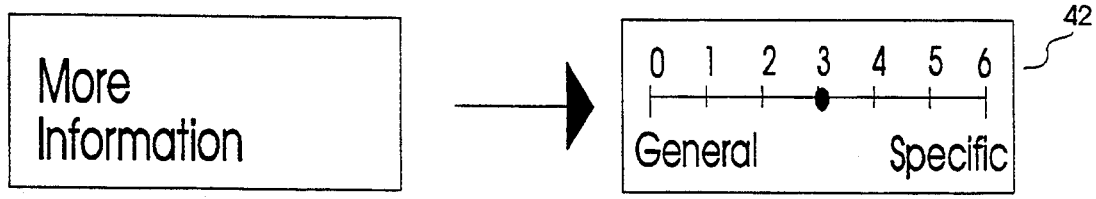
Figure 4:
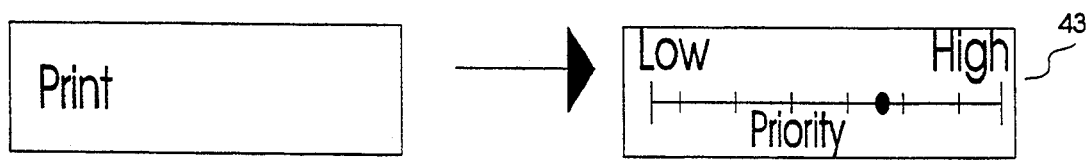
Figure 4:
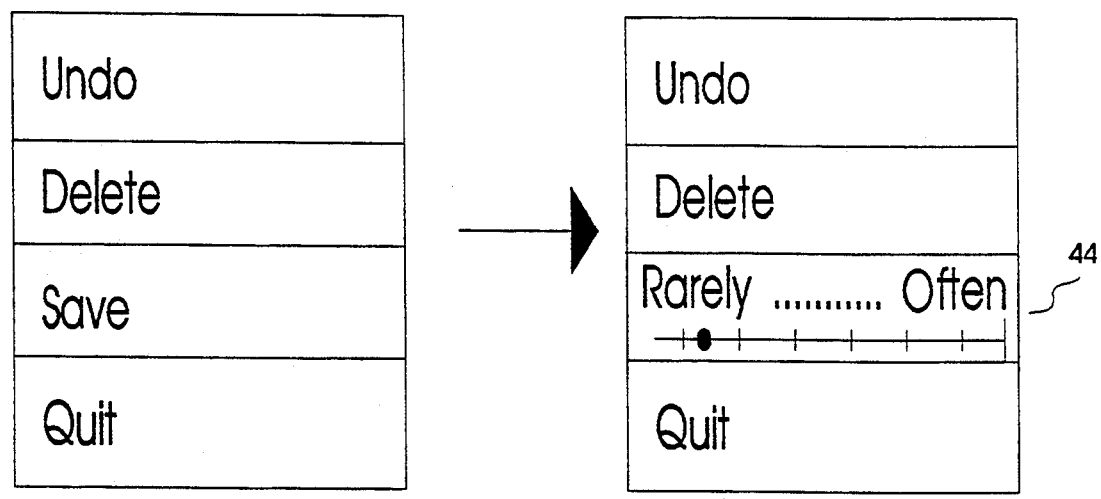

FIG. 4 shows four examples of control buttons and scales which might be useful. The scales on the right correspond to the control buttons on the left. Using the modified method of FIG. 3, the scale overwrites the normal key label when the user presses the mouse button with the cursor positioned on the control button. The pointer position is indicated on the scale by the large dot.

Smart Buttons may be used in any online information system to gather feedback from users on the usefulness of information being displayed. Users might click on a PAGE FORWARD button to request the next page from an online information system. If the system were equipped with Smart Buttons, the PAGE FORWARD BUTTON might display a scale (ranging from 1 to 5) as soon as the user depressed the mouse key. Then the user could move the mouse arrow along the scale on the button, releasing the mouse button when the arrow pointed to the number on the scale corresponding to his or her opinion of the usefulness of the information that was just read.

By using the Smart Button the user performed a single operation—clicking at a particular spatial location on a button, but the system obtained two pieces of information: 1) The user's opinion (on a numerical scale) of the information just displayed. 2) The command to execute whatever function the button normally executes—PAGE FORWARD in this example. The information about the user's opinion may alter the function that the button performs. Perhaps the system normally provides ten pages of information on a given topic. If the user indicates that the topic is not of interest, the system may use that knowledge to skip some of the pages when PAGE FORWARD is pressed. Conversely, the system may add related pages if the user expresses great interest.

Smart buttons are economical because they obtain two pieces of information from a single selection by the user. The program interface actively solicits user preferences via a rating scale similar to the LIKERT scale. The function of the buttons can change as a result of the preference expressed by the user.

It is important to clarify that "button" is used in its most generic sense. A button could be any interface control including pull-down menu items, items on conventional menus, knobs, levers, templates—essentially any interface control that executes an action when it is selected.

In addition to the online document reader example described above, Smart Buttons can provide the following useful functions in many different types of applications. In each of the examples that follow, it is assumed that a scale similar to the LIKERT SCALE is built into the "buttons." Then the following functions become possible:

1. FUNCTION: Capture user's rating of usefulness of information being presented by system.

EXAMPLES; Online information system described above. Tutorials. Users could control the speed with which tutorial information was being presented by clicking on a scale. If the information was being presented too slowly, the system would speed up. If the presentation speed was too fast, users could tell the system to slow down. Besides speed, users could communicate their preferences for greater or lesser amounts of detail, depending on where they clicked on the scale. (See FIGS. 4, 41 and 42).

2. FUNCTION: Capture user's preferences for the layout and design of the interface itself.

EXAMPLES: By clicking on a pull-down menu item, users could rate how often they need to use that menu choice. A high rating would cause the menu to rearrange itself so that it appears first on the pull-down menu. A lower rating would cause the item to appear later in the menu list. (See FIGS. 4, 44).

3. FUNCTION: Capture user's priorities on actions the system is being asked to execute.

EXAMPLES: Users could indicate the priority of a print job in a queue, by clicking along a scale on the PRINT button. Similarly, for any system activity that might take a significant amount of time or processing power, it would be advantageous for users to be able to easily indicate priorities to the system in this way. A common example is search of a database. How long should the system search? Database searches can be extremely costly. By clicking on a scale that appeared on the SEARCH button, users could indicate how much resource the system should devote to a database search before giving up. (See FIGS. 4, 43).

4. FUNCTION: Help the system acquire a more accurate model of the task the user is concerned with.

EXAMPLES: As intelligent tutors and expert systems become increasingly common, it becomes ever more important that these Artificial Intelligence (AI) systems have a way of updating and improving their models of the user. Clicking on a scale is one way users might indicate to the system what the relative importance is of each of the actions the user asks the system to take. This feedback on the part of the user could help an AI system make more intelligent guesses (inductions) as to what the user is trying to do. The more accurately the AI system is able to model the user, the more effective the advice, intelligent help, or other actions of the system can be.

5. FUNCTION: Help users create useful macros.

EXAMPLES: If users indicate the usefulness of various buttons, the system can create a list of those buttons, and combinations of buttons most frequently used. This list could be presented to the user with the suggestion that Macros be defined to help the user accomplish common tasks more quickly.

Pointing devices such as mice or trackballs typically are supplied with a software called a device driver which provides a callable set of functions. One of these functions is to identify the current cursor location on the screen. Regardless of how this is done by a particular system, ascertaining the cursor position is a well known process which is required in all computer systems with a graphical user interface. Determining whether the cursor is inside of or on a control button is also a well known process.

The process of mapping the position of the cursor or pointer into a control value can be performed in several ways. Essentially the selected dimension of the button, either the horizontal or vertical dimension, is divided into regions corresponding to the possible values which the user can enter. Thus, if the desired value can only be an integer ranging from 1 to 5, then there will be 5 regions on the button. The position of the cursor on the button will be converted into the control value by assigning a first region of the button, e.g., the leftmost region, the lowest control value and the last region, e.g., the rightmost region, the highest control value. The values associated with the intervening regions will typically vary uniformly from the lowest to the highest value based on the region's proximity to the first or last region. The granularity of the value which can be entered will, of course, vary with the precision with which the cursor can be positioned and the size of the control button, etc. If there are 5 regions on the control button, these will typically be at least roughly rectangularly shaped. The problem of determining whether the cursor is in one of these regions is exactly the same problem as determining whether the cursor is somewhere on the control button and can be performed using prior art techniques. The control button is simply a larger region composed of smaller regions when viewed in this way.

The following Table contains an example of PSEUDO-CODE describing an embodiment of the invention similar to the method illustrated in FIG. 3.

TABLE 1

```
If (MousePressDetected) and (CorrectRange(MousePointer))
Then
    /*MousePressDetected is a Boolean function returning    */
    /*TRUE if the user depresses a mouse button.            */
    /*CorrectRange is a Boolean function; returns TRUE if   */
    /*position of the mouse pointer overlaps with an area   */
    /*defined to be a button. MousePointer is a parameter   */
    /*reflecting the position of the mouse pointer when the */
    /*mouse button was pressed.                             */
If (SmartButtonOn) Then
    /*SmartButtonOn is a boolean variable that is set to    */
    /*TRUE when the SMART BUTTON feature is enabled         */
    /*on the interface by user action or by a program.      */
Begin
    Repeat  /*Loop until user chooses a LIKERT rating.      */
        DisplayLikertScale(MousePointer)
            /*Display a LIKERT SCALE in the button          */
            /*area. Show where the user is pointing         */
            /*along the scale.                              */
        GetNewPosition(MousePointer)
            /*Update where the user is pointing until       */
            /*the user selects a score by releasing the     */
            /*mouse.                                        */
    Until (MouseReleaseDetected)
            /*MouseReleaseDetected is a boolean function    */
            /*returning TRUE when the user releases the     */
            /*mouse button. For purposes of this            */
            /*example, the function can be assumed to       */
            /*set a global variable, ButtonName, which      */
            /*identifies the button the user has            */
            /*selected. This function might also check      */
            /*that the button the user selects by           */
            /*releasing mouse is the same button that       */
            /*mouse was depressed on.                       */
    ConvertToScore(MousePointer, Score)
            /*Convert the raw mouse position data to a      */
            /*score on the Likert scale.                    */
    Call Subroutine(ButtonName, Score)
            /*Pass the Likert Score to whatever routines    */
            /*can make use of the rating information.       */
            /*Because the action associated with the        */
```

TABLE 1-continued

```
            /*button may change as a result of the         */
            /*rating info., ButtonName is also passed.     */
        Process(ButtonName)
            /*Execute the button that was selected.        */
    End
    Else    /*If the Smart Button option was not enabled.  */
            /*the button is still executed once it is      */
            /*selected.                                    */
        If (MouseReleaseDetected) Then
            /* Note: MouseReleaseDetected will be false    */
            /* unless a mouse button was first pressed.    */
            /* and then released.                          */
Process(ButtonName)
```

Using the foregoing specifications the invention may be implemented using standard programming and/or engineering techniques. The resulting program(s) may be stored on disk, diskettes, memory cards, ROM or any other memory device. For execution, the program may be copied into the RAM of the computer. One skilled in the art of computer science will easily be able to combine the software created as described with appropriate general purpose or special purpose computer hardware to create a computer system embodying the invention. While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A method of displaying tutorial data for a user on a computer system, the system having a display screen, means for a user to position a cursor on a plurality of locations on the display screen, and execute means for the user to indicate to the system to take action based on the current position of the cursor, comprising the steps of:
    displaying a first tutorial data item on a first portion of the display screen;
    displaying a control button having an associated tutorial control function on a second portion of the display screen, the control button including a plurality of regions on which the user can position the cursor, the regions extending from a first region at a first boundary through a last region at a secondary boundary;
    monitoring the execute means to detect user activation of the execute means;
    determining the selected region containing the cursor upon user activation of the execute means;
    determining a control value for the selected region by using a predetermined minimum control value for the first region and a predetermined maximum control value for the last region and computing the control value for any region, other than the first or last, based on the selected region's proximity to the first or last region;
    storing the control value as a measure of the user's subjective response to the tutorial data;
    performing the tutorial control function associated with the control button; and
    selecting a second tutorial data item to be displayed based in part on the control value.

2. The method of claim 1, the selecting step further comprising the step of using the control value as a measure of the user's satisfaction with the data with the minimum control value indicating that the user is not satisfied with the data and the maximum control value indicating that the user is satisfied with the data.

3. The method of claim 1, the step of displaying the control button further comprising the step of displaying a scale with labels indicating the control values assigned to selected regions on the control button.

4. The method of claim 2 wherein the second tutorial data item is related to the first tutorial data item according to the control value so that the user exerts control over the selecting step by indicating whether the user is satisfied with the data.

5. The method of claim 2 wherein the second tutorial data item is related to the first tutorial data item according to the control value so that the user requests display of tutorial data items similar to the first tutorial data by indicating that the user is satisfied with the data.

6. A computer system, having a display screen, means for a user to position a cursor on a plurality of locations on the display screen, and execute means for the user to indicate to the system to take action based on the current position of the cursor, comprising:
    means for displaying a tutorial data item on a first portion of the display screen;
    means for displaying a control button having an associated tutorial control function on a second portion of the display screen, the control button being shaped to allow the user to position the cursor on a plurality of locations of the control button;
    means for monitoring the execute means to detect user activation of the execute means;
    means for determining the cursor location on the control button upon user activation of the execute means;
    means for mapping the cursor location to a control value usable by the system;
    means for storing the control value as a measure of the user's subjective response to the tutorial data;
    means for performing the tutorial control function associated with the control button; and
    means for selecting a second tutorial data item to be displayed based in part on the control value.

7. The system of claim 6, further comprising means for using the control value as a measure of the user's satisfaction with the data displayed on the screen.

8. The system of claim 6, wherein the means for displaying the control button further comprises means for displaying a label indicating a control value for at least one location on the control button.

9. The system of claim 6, wherein the means for displaying the control button further comprises means for displaying labels indicating the maximum and minimum control values for the control button and regions on the control button associated with the maximum and minimum control values.

10. The system of claim 6, wherein the means for displaying the control button further comprises means for displaying a label indicating a location on the control button which maps to a value indicating that the data is useful and a label indicating a location on the control button which maps to a value indicating that the data is useless.

11. The system of claim 6, wherein the control button has a plurality of regions extending from a first region at a first boundary through a last region at a second boundary and the controls values range from a lowest to a highest value, the means for mapping further comprising:

means for assigning the first region a first numerical quantity representative of the lowest control value and the last region a second numerical quantity representative of the highest control value;

means for assigning each region, other than the first and last, a numerical quantity representative of a control value ranging between the lowest control value and the highest control value based on the region's proximity to the first or last region;

means for determining a cursor region by finding a region corresponding to the cursor location on the control button; and means for storing the numerical quantity assigned to the cursor region as the control value.

12. The system of claim 6, wherein the means for displaying the control button further comprises:

means for displaying text or symbols indicating the function associated with the control button; and means for displaying a scale indicating the range of control values after the user presses a selected key.

13. The system of claim 6 wherein the second tutorial data item is related to the first tutorial data item according to the magnitude of the control value so that the user exerts control over the selecting step proportionally to the control value indicating whether the user is satisfied with the data.

14. The system of claim 6 wherein the second tutorial data item is related to the first tutorial data item according to the magnitude of the control value so that the user requests display of tutorial data items similar to the first tutorial data by indicating that the user is satisfied with the data.

* * * * *